No. 718,871. PATENTED JAN. 20, 1903.
J. H. PARK.
BRICK KILN.
APPLICATION FILED MAR. 7, 1898.
NO MODEL.
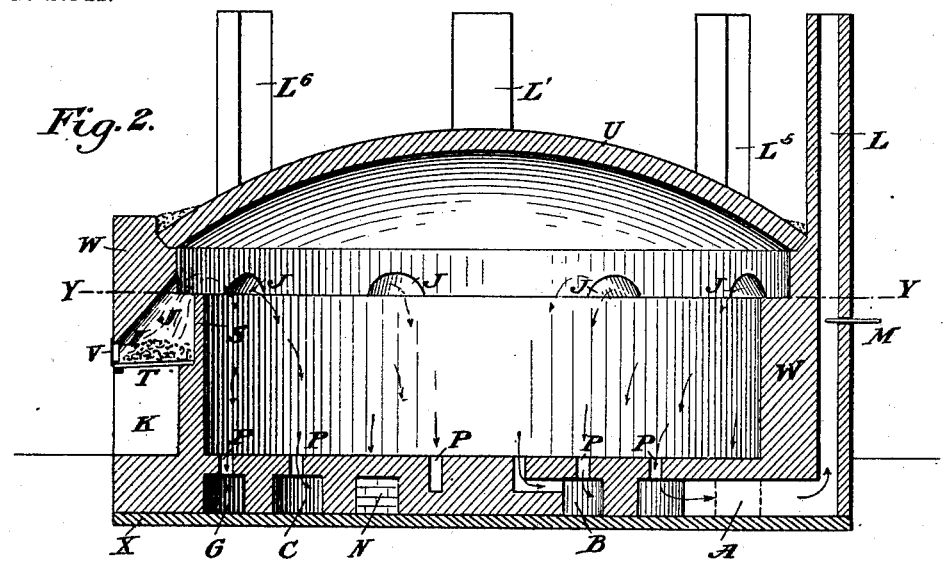
Fig. 2.
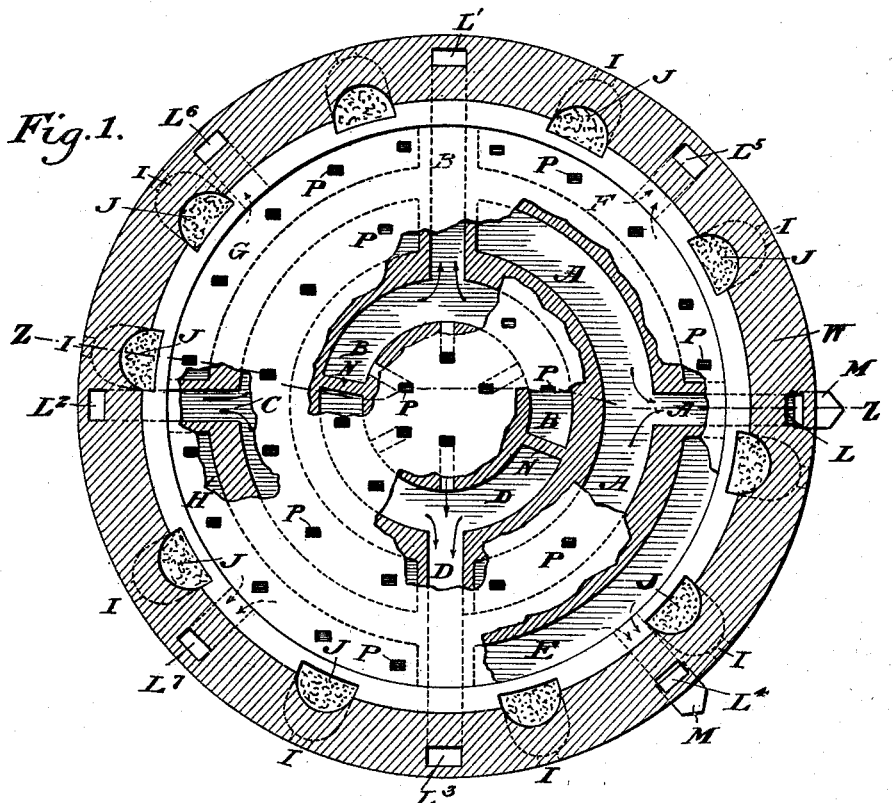
Fig. 1.
Fig. 3.
WITNESSES
INVENTOR
John H. Park

UNITED STATES PATENT OFFICE.

JOHN H. PARK, OF PARK QUARRIES, PENNSYLVANIA.

BRICK-KILN.

SPECIFICATION forming part of Letters Patent No. 718,871, dated January 20, 1903.

Application filed March 7, 1898. Serial No. 672,952. (No model.)

*To all whom it may concern:*

Be it known that I, JOHN H. PARK, of Park Quarries, in the county of Beaver and State of Pennsylvania, have invented a new and useful Improvement in Brick-Kilns, of which the following is a full, clear, and exact description, reference being had to the accompanying drawings, forming part of this specification, in which—

Figure 1 is a horizontal section on the line Y Y of Fig. 2 with portions of the flues and furnaces broken away. Fig. 2 is a vertical section on the line Z Z of Fig. 1, and Fig. 3 is a detail elevation of the door-frame of one of the furnaces.

My invention relates to the class of kilns for burning brick, crockery, sewer-pipe, and other pottery products wherein the floor of the kiln is arranged for a downdraft which passes through ports therein and thence to the offtake-flues; and its object is to provide a downdraft-kiln wherein the heat in any part of the same can be regulated by controlling the draft through this section independently of the other sections.

A further purpose is to improve the construction of the kiln-walls and the fire-bags, so that the wall will be stronger and longer lived than formerly and can be more easily built.

In the drawings, X represents the foundation for the kiln and W its wall, this wall being made of sufficient thickness so that the furnaces I and the fire-bags J are inclosed within and extend through it. I have shown the kiln as of circular form; but it may be made elliptical or square or of any other desired shape. The floor of the kiln is provided with circular series of downdraft-ports P, which lead to separate arc-shaped flues A, B, C, D, E, F, G, and H, each arc-shaped flue being independent of the others and each having an offtake-flue marked with a similar reference-letter and independent of the other offtake-flues, each such flue leading to a separate chimney. These chimneys are marked L L' L² L³, &c. The main offtake-flue for each arc-shaped flue extends radially, and its side walls divide the circular flues into the arc-shaped sections, except in the case of the inner flue B, which is divided by walls N. The number of arc-shaped flues and the corresponding main offtake-flues may of course be varied, if desired, according to the size of the kiln or the articles baked or burned therein, and the flues may be of any desired shape. In the case of a kiln of another shape the flues A B C, &c., would be of different shapes to correspond to the shape of the kiln; but each such flue must have its own independent offtake-flue, which is valve-controlled and is separate from the other offtake-flues. The draft through the flues is controlled by dampers M in the chimneys.

In building the furnaces and fire-bags instead of building an arch over the furnace I step off each course of brick at each side of the fire-bag passage, so that the wall is but little weakened and can be easily built and repaired.

The kiln-wall is built solid between the fire-bags, giving a smooth continuous inner face and preventing the settling away of the wall, so as to admit air to the chamber.

K represents the ash-pit below each furnace; T, the grate-bars, which may be of any desired form and may extend at any angle, and V is the fire-door.

The lower bricks over the fire-bags are supported by the door-frame or by an iron support therefor.

The crown of the kiln U may be provided with several openings to assist in cooling off the kiln and to be used during green burning, these openings being closed during the regular burning operation.

In operating the kiln if any part thereof—the central portion, for example—is found cooler than the rest by closing the dampers, either partially or wholly, for the offtake-flues of the other sections the heat will thus be forced to the center and raise the ware in that portion to the desired temperature. Similarly if any portion of the kiln is too hot by shutting the damper in the chimney connected with the flue-section under such portion of the kiln the heat can be thrown into the other portions and reduced in this part. It is therefore obvious that with my construction the heat in all parts of the kiln is under perfect control on account of the independent damper-controlled flue which leads from the flue-section under each part of the floor. The particular construction of the combustion-chamber and fire-bags is also of advantage in lengthening the life of the kiln and making it easier to build and repair, as well as preventing settling of the wall and allowing air to enter it.

Many changes may be made in the form and shape of the kiln and the various flues without departing from my invention.

I claim—

1. A downdraft-kiln having on all sides thereof separated floor-flues located at successively different distances from the center of the kiln and between it and the outer wall, all of said flues being on substantially the same level, and each communicating with the kiln by openings in different parts thereof, and separated offtake-flues, one for each floor-flue, each offtake having a controlling-valve to regulate the heat in any part of the kiln; substantially as described.

2. A downdraft-kiln having fire-bags extending around the same on all sides, separated floor-flues extending around the kiln-chamber at different points between the center and the outer walls, all said flues being on substantially the same level, and each communicating with a kiln by ports in different parts thereof, and separated offtake-flues on all sides of the kiln, one for each floor-flue, each offtake having a controlling-valve; substantially as described.

3. A downdraft-kiln having separated inner and outer floor-flues with openings into the kiln, each floor-flue having a separate valve-controlled offtake-flue, the offtake-flues for the inner floor-flues cutting through the outer floor-flues, and all the flues being on the same level; substantially as described.

4. A kiln having substantially arc-shaped separated concentric floor-flues, with ports leading into the kiln, each such flue having a separate valve-controlled offtake-flue leading to a separate chimney, all the flues being on the same level; substantially as described.

In testimony whereof I affix my signature in presence of two witnesses.

JOHN H. PARK.

Witnesses:
  WM. A. PARK,
  J. P. LEAF.